A. ABEL.
MACHINE FOR MEASURING THE SURFACE OF LEATHER OR THE LIKE
APPLICATION FILED JAN. 27, 1914.

1,110,278.

Patented Sept. 8, 1914.
2 SHEETS—SHEET 1.

Witnesses:

Inventor:

A. ABEL.
MACHINE FOR MEASURING THE SURFACE OF LEATHER OR THE LIKE.
APPLICATION FILED JAN. 27, 1914.

1,110,278.

Patented Sept. 8, 1914.

2 SHEETS—SHEET 2.

Witnesses:

Inventor:

UNITED STATES PATENT OFFICE.

AUGUST ABEL, OF FRANKFORT-ON-THE-MAIN, GERMANY, ASSIGNOR TO MASCHINEN-FABRIK MOENUS A.-G., OF FRANKFORT-ON-THE-MAIN, GERMANY.

MACHINE FOR MEASURING THE SURFACE OF LEATHER OR THE LIKE.

1,110,278. Specification of Letters Patent. Patented Sept. 8, 1914.

Application filed January 27, 1914. Serial No. 814,834.

*To all whom it may concern:*

Be it known that I, AUGUST ABEL, a subject of the King of Bavaria, residing at 1 Blanchardstrasse, Frankfort-on-the-Main, in the Kingdom of Prussia and Empire of Germany, have invented new and useful Improvements in Machines for Measuring the Surface of Leather or the like, of which the following is a specification.

My invention relates to machines for measuring the surfaces of leather or the like, in which the measuring wheels are adapted to roll over the leather, and has for its object to obviate in such machines any differences or inaccuracies of measurement caused by different thicknesses of the leather. Moreover, the invention is designed to also exclude such inaccuracies as are due to the confining lines of the leather running obliquely to the direction of the travel.

According to my said invention the machine is so constructed that the measuring operation is commenced by continuously acting feeler rolls which at the front and rear edges of the leather automatically establish and interrupt the connection of the measuring parts with the transmission gear, the commencement and termination of the measuring operation being however independent of the upward or downward movement of the measuring parts during the introduction and exit of the leather.

In the accompanying drawings I have represented, by way of example, a constructional form of my said invention.

Figure 1:
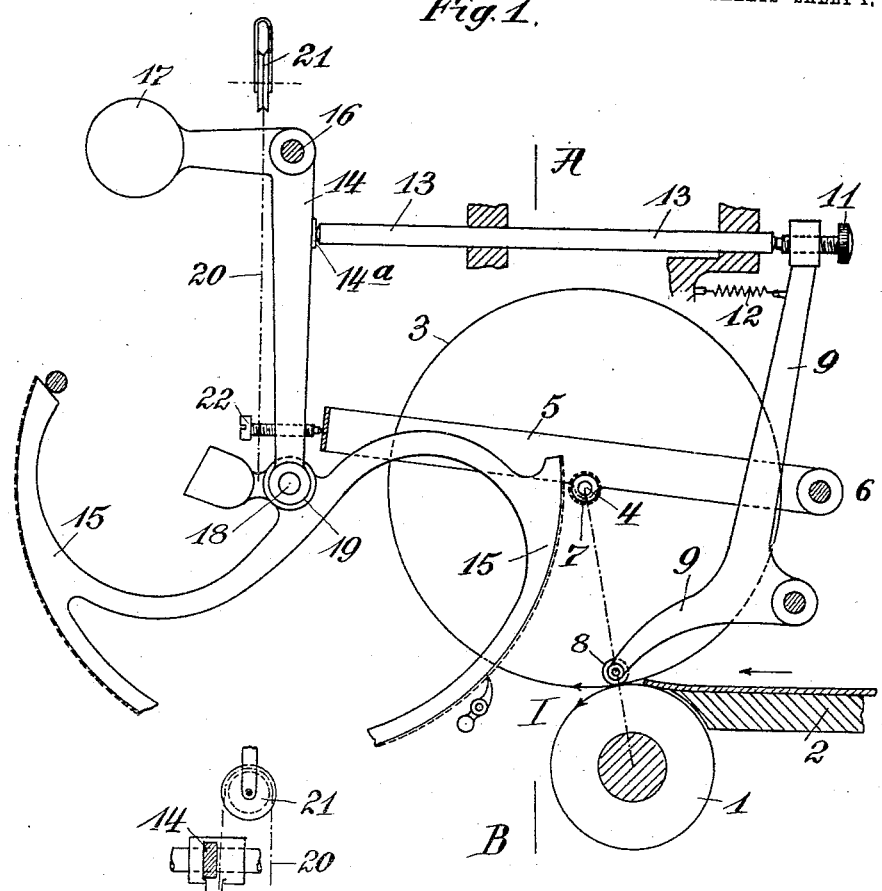
Figures 2, 3:
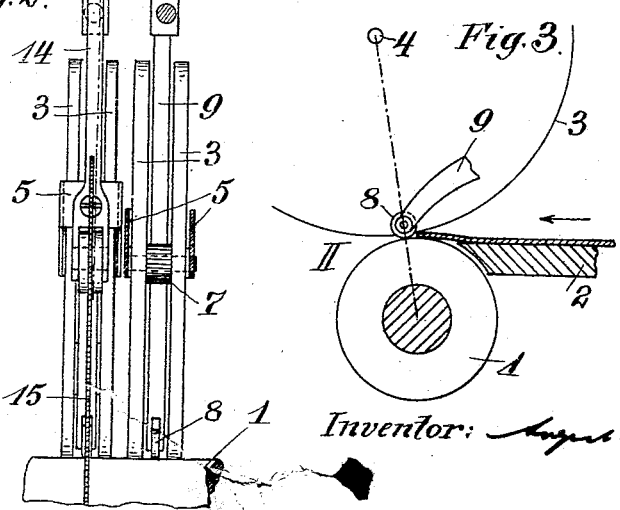
Figure 4:
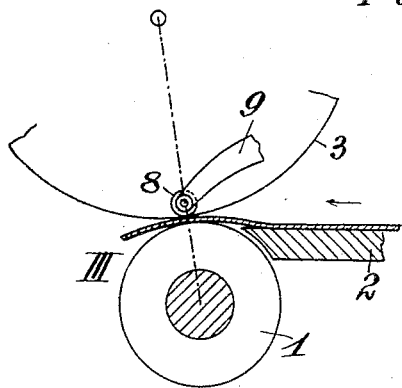
Figure 5:
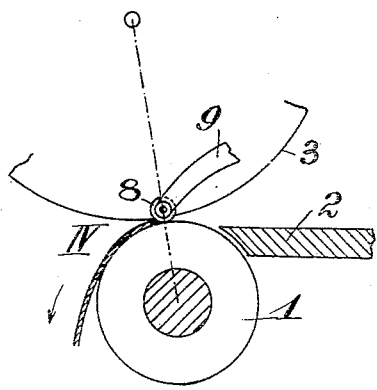
Figure 6:
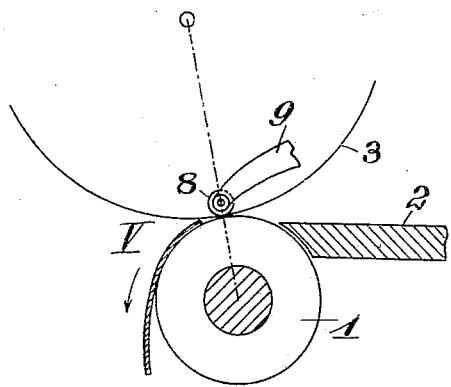

Figure 1 is a transverse section through the machine, showing the gear requisite for the measuring operation of a measuring wheel and including a toothed wheel or segment necessary for the transmission of the measurement to the indicating device. All the parts in the figure appear in the position of rest, wherein the entire mechanism serving for the reception of the leather is kept in readiness for operation. Fig. 2 shows a front view of two of these elements illustrated in Fig. 1, the two elements being placed side by side, and the element on the left hand side being shown as seen directly from the front, whereas the element on the right hand side is shown in section on the line A—B, Fig. 1. Fig. 3 illustrates in diagram the feed roller, table, measuring wheel and feeler roll, the measuring wheel being raised by the leather introduced between it and the feed roller, whereas the feeler roll as yet occupies its position of rest. Fig. 4 represents the same parts as Fig. 3, the leather introduced between the feed roller and the measuring wheel having raised the feeler roll. Fig. 5 represents the same parts as Figs. 3 and 4, these parts being shown in the position which they occupy just before the leather leaves the measuring wheel, the feeler roll having already descended behind the leather into contact with the feed roller. Fig. 6 shows the position of the aforesaid parts at the moment when the leather has escaped from the measuring wheel, so that the latter as well as the feeler roll are in contact with the feed roller. Thus Figs. 3 to 6 illustrate the mode of operation of one of the elements at different stages of the work.

In the improved measuring machine the toothed wheels or segments serving as transmission gear are usually not in engagement with the pinions of the measuring wheels, but are brought into engagement therewith only at the beginning of the measuring operation, and are separated again at the end of such operation. As usual, a driven feed roller 1, Fig. 1, is provided, upon which the leather to be introduced over a table 2 is moved in the direction indicated by an arrow. Resting upon the feed roller 1 is the measuring wheel 3 driven by the said roller and held upon the axis 4 in a lever 5 which is fixed at 6 in the frame of the machine and adapted to swing. Each measuring wheel consists of two separate rims, Fig. 2, which are firmly connected with each other by the pinions 7. Between the two halves of the measuring wheel a feeler roll 8 is placed upon the feed roller 1. This feeler roll 8 is arranged upon the short arm of a bell-crank lever 9 pivoted at 10, the long arm of this lever having at its end an adjusting screw 11. A spring 12 attached to the long arm of the lever 9 serves to force the feeler roll 8 continually against the periphery of the feed roller 1. Against the adjusting screw 11 bears one end of a rod 13 adapted to be displaced in the frame of the machine, while the lever 14 bears at 14ª against the other end of the aforesaid rod, the lever 14 carrying at its long arm, by means of bolt 18, the toothed wheel or segment set in motion by the measuring wheel. Around the nave or boss 19 of the segment 15 is placed a band or chain 20, which passes over the pulley 21 of the totaling device, in order to so transmit the turning movements of the segment that the measurement will be transmitted to the indicating device. The lever 14 is arranged to turn upon the axis 16 and is provided with a counter-weight 17 such that the downwardly extending arm together with the segment 15 tends to move toward the pinion 7 of the measuring wheel 3. The screw 11 of the bell-crank lever 9 is so adjusted that the space between the toothed segment 15 and the pinion 7 will be as small as possible. At the end of the lever 14, just above the bolt 18, is arranged an adjusting screw 22 at the hight of the measuring-wheel lever 5.

The adjustment of the whole system of levers takes place in the following manner, that is to say, the screw 11 is so adjusted that the segment 15 is at a very small distance away from the toothed pinion 7 of the measuring wheel 3 and is consequently not carried away by the pinion. On the other hand the adjustment of the screw 22 may serve to determine a favorable operative position of the segment 15, wherein the teeth of the segment cannot extend to the bottom of the spaces between the teeth of the pinion 7 so that very little friction will be caused between such teeth. Now if the leather is fed between the feed roller 1 and the measuring wheels 3, such leather, in case it is thick, will come in contact with the periphery of the measuring wheels some distance in advance of the point or line of contact between the measuring wheels and the feed roller, thus passing to the position illustrated in Fig. 1. At this moment the measuring wheels are raised, Fig. 3, and caused to turn, but in contradistinction to the measuring machines heretofore employed no engagement takes place between the teeth of the pinions 7 and the teeth of the segments 15, so that no measurement can take place. It is only when the leather is conducted farther over the feed roller 1 and feeler rolls 8 so as to lift the same, Fig. 4, that the segments 15 will engage with the pinions 7 of the measuring wheels 3. As the feeler rolls 8 are lifted, the long arm of the lever 9 together with the adjusting screw 11 in each element is moved away from the rod 13 against the pull of the spring 12. Accordingly the transmission rod 13 subjected to the action of the weight 17 follows, the lever 14 moves in conjunction with the segment 15 toward the pinion of the measuring wheel and engages therewith, but only as far as the adjustment of the screw 22 will permit; this adjusting screw impinges against the end of the measuring-wheel lever 5 and supports the same.

From the moment when the feeler roll 8 is lifted the measurement commences, that is to say, the movements of the measuring wheel are transmitted to the transmission gear and indicating device of the machine. The aforesaid moment is accurately determined and depends on the time when the leather to be measured reaches the point of contact between the feed roller 1 and measuring wheel 3. Of course the point of contact lies exactly in the line extending from the axis of the measuring wheel to the axis of the feed roller. The axis of the feeler roll 8 likewise falls exactly in the aforesaid line. As soon as the leather after having been measured passes to the position indicated in Fig. 5, that is to say, when it has just left the feeler roll 8, the latter has passed again to its position of rest upon the feed roller 1 and has, through the medium of the mechanism 9, 10, 11, 12, 13, 14, 15, 16, 17, caused the segment 15 to be again disengaged from the pinion 7 of the measuring wheel 3. After this moment the measuring wheel can turn farther without having the slightest action upon the transmission gear and measuring gear. On the leather also leaving the measuring wheels 3 these wheels pass again to the position of rest, wherein they bear upon the feed roller 1, as shown in Fig. 6.

The feeler roll 8 acts uninterruptedly, inasmuch as at any movement it is ready, on the introduction of the leather and at the moment of the passage of the latter to the point of contact between the measuring wheel and feed roller, to commence the measurement, and in like manner at the rear edge of the leather, on the passage of the latter from the point of contact, to suddenly discontinue the measuring operation. It is quite immaterial whether the several parts of the leather passed through have different thicknesses either at the edge or within the area or surface of the same for the described coupling mechanism, provided between the measuring wheel and segment and subjected to the action of the feeler roll, is constructed in such an expedient manner that the differences in the thickness of the leather cannot have any deleterious effect upon the accuracy and certainty of the measurement. Owing to the fact that the measurement without exception commences and terminates exactly at the point of contact between the measuring wheel and the feed roller and that at this moment the measuring wheels are brought into or out of engagement with the transmission gear, pieces of leather of different thicknesses cannot cause any inaccuracies in the measurement on being introduced into the machine and on leaving the same.

In the measuring machines heretofore constructed on the rolling principle a certain width of the measuring wheels was necessary in order to obtain that the leather should be surely carried away by the measuring wheels at as small a specific pressure as practicable. However the broader the measuring wheel was constructed, the greater were the inaccuracies caused by variable confining-lines of the leather such that the measurement already took place at the confining-line of the two lateral edges of the measuring wheel. With the described arrangement of the feeler roll causing the commencement and the termination of the measurement, it is however possible to construct the feeler roll as narrow as possible without thereby interfering with the certainty of the feed of the leather, because such feed is not affected by the feeler roll, but by the measuring wheels or the halves of the measuring wheels which, as will be readily understood, may be of any desired width, because such width has no influence upon the measurement.

I claim:—

1. In a machine of the character described the combination, with measuring wheels adapted to roll over the leather to be measured, a feed roller and transmission gear, of feeler rolls, means connecting said feeler rolls with said measuring wheels arranged for automatically establishing and interrupting the engagement of the measuring wheels with the aforesaid transmission gear.

2. In a machine of the character described the combination, with measuring wheels consisting of two halves, of feeler rolls arranged each between the said two halves of such measuring wheels and means connecting said feeler rolls with said measuring wheels.

3. In a machine of the character described the combination, with a feeler roll and a segment, of a lever mechanism connecting said feeler roll with said segment and adapted for converting a small movement of the feeler roll into a larger movement of the said segment.

4. In a machine of the character described the combination, with segments, levers wherein these segments are pivoted, measuring wheels and pinions thereon, of weights provided on the said levers and adapted for moving the aforesaid segments toward the pinions of the measuring wheels.

5. In a machine of the character described the combination of segments, measuring wheels, pinions thereon, levers provided with weights and adapted for moving the aforesaid segments toward the pinions of the measuring wheels, feeler rolls, means connecting said feeler rolls with said levers, said connecting means adapted to convert a small movement of said feeler rolls into a large movement of said segments, toward and away from said pinions.

AUGUST ABEL.

Witnesses:
JEAN GRUND,
CARL GRUND.

Copies of this patent may be obtained for five cents each, by addressing the "Commissioner of Patents, Washington, D. C."